(12) United States Patent
Jackson et al.

(10) Patent No.: US 8,793,694 B2
(45) Date of Patent: Jul. 29, 2014

(54) POLICY DRIVEN AUTONOMIC PERFORMANCE DATA COLLECTION

(75) Inventors: Rachel Jackson, Wilshire (GB); Paul Kettley, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1269 days.

(21) Appl. No.: 12/393,395

(22) Filed: Feb. 26, 2009

(65) Prior Publication Data
US 2010/0218188 A1  Aug. 26, 2010

(51) Int. Cl.
*G06F 9/46* (2006.01)

(52) U.S. Cl.
USPC .......................................... 718/101; 718/100

(58) Field of Classification Search
USPC .................................. 718/100, 101
See application file for complete search history.

(56) References Cited

U.S. PATENT DOCUMENTS

| | | | |
|---|---|---|---|
| 6,363,260 B1 * | 3/2002 | Achour et al. ............. | 455/553.1 |
| 6,850,525 B2 * | 2/2005 | Mitsumori et al. ...... | 370/395.52 |
| 7,395,187 B2 | 7/2008 | Duyanovich et al. | |
| 7,630,955 B2 * | 12/2009 | Byrd et al. ............................ | 1/1 |
| 7,739,668 B2 * | 6/2010 | Cruickshank et al. ........ | 717/128 |
| 8,015,148 B2 * | 9/2011 | Theurer ........................ | 707/607 |
| 8,032,867 B2 * | 10/2011 | Bansal .......................... | 717/128 |
| 8,141,051 B2 * | 3/2012 | Huang et al. .................. | 717/127 |
| 2003/0120771 A1 | 6/2003 | Laye et al. | |
| 2005/0273780 A1 * | 12/2005 | Torvinen ....................... | 717/171 |
| 2006/0004865 A1 * | 1/2006 | Theurer ..................... | 707/104.1 |
| 2006/0101308 A1 | 5/2006 | Agarwal et al. | |
| 2006/0178918 A1 | 8/2006 | Mikurak | |
| 2007/0094281 A1 * | 4/2007 | Malloy et al. ................. | 707/100 |
| 2008/0097801 A1 * | 4/2008 | MacLellan et al. ............... | 705/7 |

* cited by examiner

Primary Examiner — Aimee Li

(74) Attorney, Agent, or Firm — Wood, Herron & Evans LLP

(57) ABSTRACT

An autonomic method, apparatus, and program product are provided for performance data collection. A start time and a stop time are monitored for an application. The start time is compared with the stop time to determine whether or not the application is meeting a performance target of the application. If the application is not meeting the performance target for the application, performance data collection is autonomically started for the application.

17 Claims, 5 Drawing Sheets

| OCCURRENCE | POTENTIAL POLICY ACTION |
|---|---|
| ANY APPLICATION/TASK FAILS WITH SLA EXCEPTION - NO ACTION. | NO-OP |
| FIRST APPLICATION/TASK FAILS WITH SLA EXCEPTION – START REQUIRED TRACE IMMEDIATELY. | START DEBUG TRACE. SET INDICATOR – SLA FAILURE HAS OCCURRED. |
| FIRST APPLICATION/TASK FAILS WITH SLA EXCEPTION – START REQUIRED TRACE IMMEDIATELY. | START PERFORMANCE TRACE. SET INDICATOR – SLA FAILURE HAS OCCURRED. |
| FIRST APPLICATION/TASK FAILS WITH SLA EXCEPTION – START REQUIRED TRACE IMMEDIATELY. | START DEBUG TRACE AND PERFORMANCE TRACE. SET INDICATOR – SLA FAILURE HAS OCCURRED. |
| 'N'TH APPLICATION/TASK FAILS WITH SLA EXCEPTION – START REQUIRED TRACE AFTER 'N' TASKS HAVE FAILED TO MEET SLA TARGETS. | START DEBUG TRACE AND PERFORMANCE TRACE. SET INDICATOR – SLA FAILURE HAS OCCURRED. |
| 'N'TH APPLICATION/TASK FAILS WITH SLA EXCEPTION – START REQUIRED TRACE AFTER 'N' TASKS HAVE FAILED TO MEET SLA TARGETS. | START DEBUG TRACE. SET INDICATOR – SLA FAILURE HAS OCCURRED. |
| 'N'TH APPLICATION/TASK FAILS WITH SLA EXCEPTION – START REQUIRED TRACE AFTER 'N' TASKS HAVE FAILED TO MEET SLA TARGETS. | START PERFORMANCE TRACE. SET INDICATOR – SLA FAILURE HAS OCCURRED. |
| 'N'TH APPLICATION/TASK FAILS WITH SLA EXCEPTION – SLA FAILURE INDICATOR IS ON | NO-OP – TRACE IS ALREADY ACTIVE |

FIG. 3

POLICY DRIVEN AUTONOMIC PERFORMANCE DATA COLLECTION

BACKGROUND

The present invention generally relates to the detection of abnormalities in systems, and more particularly, to an autonomic method, apparatus, and computer program for collecting debug data during an abnormality.

In a well behaved system, the applications, and hence the overall system, perform within target performance expectations to meet established Service Level Agreements ("SLA") under a service contract where a level of performance is formally defined. For a variety of reasons there will be occasions where the SLAs are not met causing in some instances application response times that are too high. These reasons may be volume related or there may be specific system or application issues.

Generally, in these circumstances, support personnel may be contacted for assistance in diagnosing the problem. Although, in order to diagnose the problem, the problem has to be detected and further actions generally need to be taken to establish what is actually happening within the system, causing the performance degradation. To establish what is occurring within the systems often times involves using real-time, or near realtime, systems management tools to help pinpoint which applications, if any, are suffering performance problems. These tools generally provide enough information to identify an application that is working outside its SLA performance target, but the tools may not give enough information to diagnose the real cause of the problem, such as locks, waiting for information (read/write), any other gaps potentially caused by system resources, or even flaws or bugs in program logic.

To provide the necessary information to diagnose the problem, in many circumstances, a system or application debug trace or a system or application performance monitoring trace is initiated. These traces collect debug and/or performance data that can be used by a system administrator or other support personnel to establish exactly what the application is doing and why the application is not meeting its normal performance targets. However, the application/system traces are typically manually started, allowed to run for some period time, and then manually stopped. This can lead to the traces running for longer than necessary to capture the problem, or may even miss capturing the data entirely.

This process may also contribute to extending the time for diagnosing the origin of the excessive application response times. Additional interactions may result between the support personnel and system administrator (or other customer) including for example, not only the initial contact, but also multiple requests for trace data if the traces were not manually started and stopped at the appropriate times, or false SLA failures due to the additional overhead of the traces from unnecessarily extended trace periods.

BRIEF SUMMARY

Embodiments of the invention provide a method, apparatus, and program product for autonomically collecting performance data for applications and/or tasks within applications. Start and stop times of the applications and/or tasks are monitored to determine if the applications or tasks are meeting their associated performance target. If the applications and/or tasks are not meeting their performance targets, a performance data collection is autonomically started for the application and/or task. Tasks within applications may include sub-applications, logic algorithms, database access, general input/output, and combinations thereof.

In some embodiments, starting the performance data collection includes starting a debug trace or starting a performance trace, depending on the capabilities of the computer system. In other embodiments, starting the performance data collection includes the combination of starting a debug trace and starting a performance trace.

Some embodiments set an indicator indicative of the application and/or task not meeting its performance target. In these embodiments, a start time and a stop time of a second application and/or task is monitored to determine if the second application is meeting its performance target. If the second application is meeting its performance target, the performance data collection is autonomically stopped for the previous application and the indicator is reset. In embodiments not having an indicator, the performance data collection is autonomically stopped for the previous application and/or task if the second application and/or task meets its performance target.

In some embodiments, the performance target is adjusted to account for the additional overhead resulting from the performance data collection. In some embodiments, the performance target is a Service Level Agreement ("SLA").

BRIEF DESCRIPTION OF THE SEVERAL VIEWS OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 3 is a table of potential policy actions for SLA exceptions.

Figure 1:
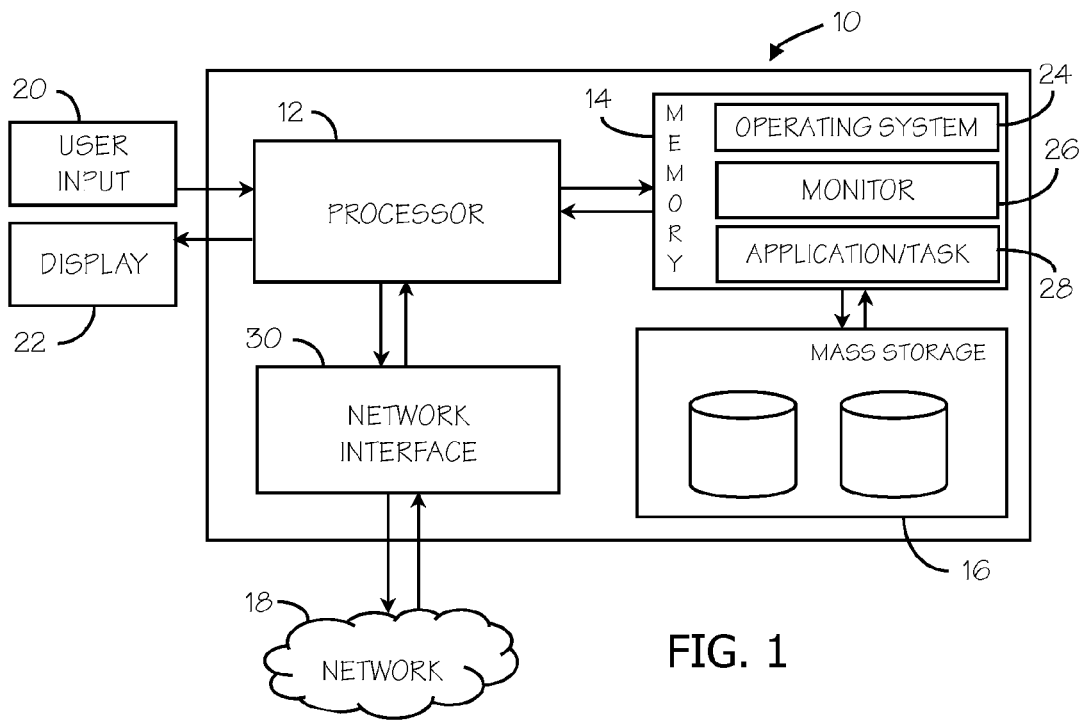
FIG. 1 is a block diagram of an exemplary hardware and software environment for a computer suitable for implementing autonomic collection of performance data consistent with embodiments of the invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

Embodiments of the invention are provided for autonomic collection of performance data. Generally, a start time and a stop time of an application is monitored to determine if the application is meeting its performance target. If the application is not meeting the performance target, a performance data collection is autonomically started for the application. A start time and a stop time of a second application may then be monitored to determine if the second application is meeting its performance target. If the second application is meeting the performance target of the second application, the performance data collection is autonomically stopped for the previous application. The second application may be a new application or, alternatively, the second application may be a subsequent instance of the same application.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now FIG. 1, an exemplary hardware and software environment is presented as a block diagram for an apparatus 10 suitable for autonomically collecting performance data consistent with the invention. For the purposes of the invention, apparatus 10 may represent practically any computer, computer system, or programmable device e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or another computer coupled to computer 10 via a network 18.

Computer 10 also typically receives a number of inputs and outputs for communicating information externally. For interface with a user or operator, computer 10 typically includes one or more user input devices 20 (e.g., a keyboard, a mouse, a trackball, a joystick, a touchpad, a keypad, a stylus, and/or a microphone, among others). Computer 10 may also include a display 22 (e.g., a CRT monitor, an LCD display panel, and/or a speaker, among others). The interface to computer 10 may also be through an external terminal connected directly or remotely to computer 10, or through another computer communicating with computer 10 via a network 18, modem, or other type of communications device.

Computer 10 operates under the control of an operating system 24, and executes or otherwise relies upon various computer software applications, components, programs, objects, modules, tasks, data structures, etc. (e.g. Monitor 26 or application/task 28). Monitor 26, for example, may be commercially available systems management tools, designed to help pinpoint applications or tasks which are suffering performance problems. Computer 10 communicates on the network 18 through a network interface 30.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Embodiments of the invention bring together the detection of an application or task failing to meet its target SLAs with an automatic start of debug or start of performance trace, depending on the available capability within the system, such as the system monitoring tools 26 executing on computer 10 in FIG. 1. The operating system 24 on the computer 10 that hosts the application may detect the start and end times for the application using system monitoring tools 26 within the operating system 24. Each application executing on the host system or each task operating within each application is associated with an SLA representing a performance target for the application or task. If the elapsed time for the application or task fails to meet its target SLA, then a debug and/or performance trace may automatically be started. If, or when, the application and/or task again starts to meet its target SLA, potentially due to some form of manual intervention or the problems disappearing, then the trace that was automatically started may be automatically turned off. This autonomic system manages itself without external intervention. The autonomic system monitors SLAs for applications executing on the system and uses policies to decide the nature of the start/stop trace events. If seen as a control system, the autonomic system may be encoded as a feedback error function, or in a heuristically assisted system, as an algorithm combined with set of heuristics bounding its operational space. By autonomically starting and ending traces, the performance trace and/or debug trace will only be active for the duration of the problem to assist in reducing the additional overhead resulting from an active trace.

In software engineering, tracing is a specialized use of logging to record information about a program's execution. This information is typically used by software developers for debugging purposes, and additionally, depending on the type and detail of information contained in a trace, by experienced system administrators or service personnel to diagnose common problems with software. Software tracing provides developers with information useful for debugging problems with the applications. Additionally, the data collected during the trace can be used to identify potential issues with performance of the application during execution. But, because software tracing is low-level, the possible volume of trace messages may be very high. To address performance concerns, software tracing may only be active for short periods of time as determined by the policy driven autonomic system. The debug and/or performance trace data collected may then be examined by service personnel, for example, to establish the exact nature of the performance degradation and to formulate a long term corrective action that may be taken. The capture of the data may be stored on the mass storage device 16 of computer 10 for later access by support personnel or other system managers.

Figure 2:
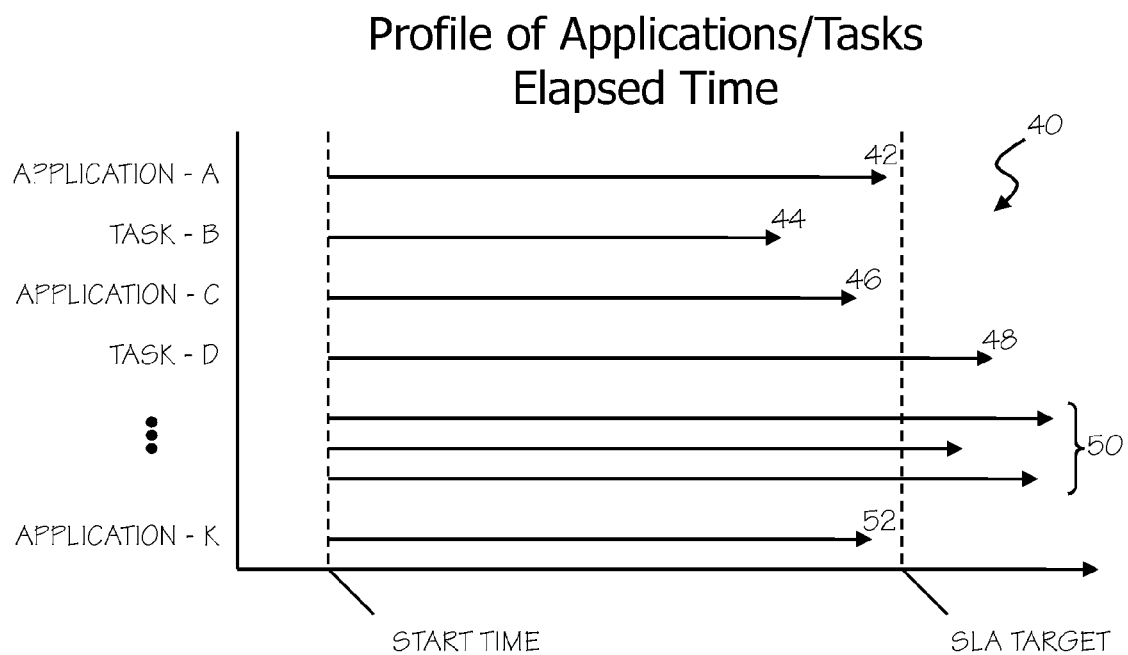
FIG. 2 is a graph illustrating elapsed times for applications and tasks executing on the system of FIG. 1.

Turning now to FIG. 2, diagram 40 shows a number of tasks or application instances executing on a computer such as computer 10. The start time of the task/application instance is tracked as is the end time of the task/application instance and elapsed time can be compared with SLA targets associated with each of the tasks/applications. For example, applications and/or tasks that complete prior to their SLA target, such as Application-A 42, Task-B 44, and Application-C 46, are considered to be confirming to set SLAs. Task-B 44 may be one of many tasks executing which collectively make up an Application-B (not shown). Tasks may include sub-applications, logic algorithms, database access, general I/O, among others. SLA performance targets may be set based on an application itself, or SLA performance targets may be set based on tasks executing within an application.

Task-D 48, in the graph in FIG. 2, is the first task or application that exceeds the target SLA time. On detection of the SLA failure of Task-D 48, policy may be used to decide on the action to be taken. Some potential policy actions for SLA failures may be seen in the table in FIG. 3. Some embodiments, depending on the system, may start a debug trace upon an SLA failure, while other embodiments may alternately start a performance trace. In still other embodiments, both a debug and a performance trace may be started. In addition to the traces, and as seen in the table in FIG. 3, some embodiments may also set an indicator, indicating that an SLA performance target has not been met. Additional traces may also be started for any intermediate applications or tasks 50 that also fail to meet SLA performance targets.

Referring again to FIG. 2, Application-K 52 is the first task that meets target SLA time, with Application-K 52 completing within the SLA target. On detection of Application-K 52 running within SLA guidelines after previous tasks and applications have been failing, policy can be used to decide what action should be taken. Some of the policy actions for SLA successes may be seen in the table in FIG. 4. In determining SLA successes, when debug and/or performance traces are active, the SLA performance targets may need to be adjusted to accommodate for the additional overhead introduced by the debug and/or performance traces. Without adjustments, this overhead may lead to false indications that SLA performance targets are not met.

Figures 4, 5:
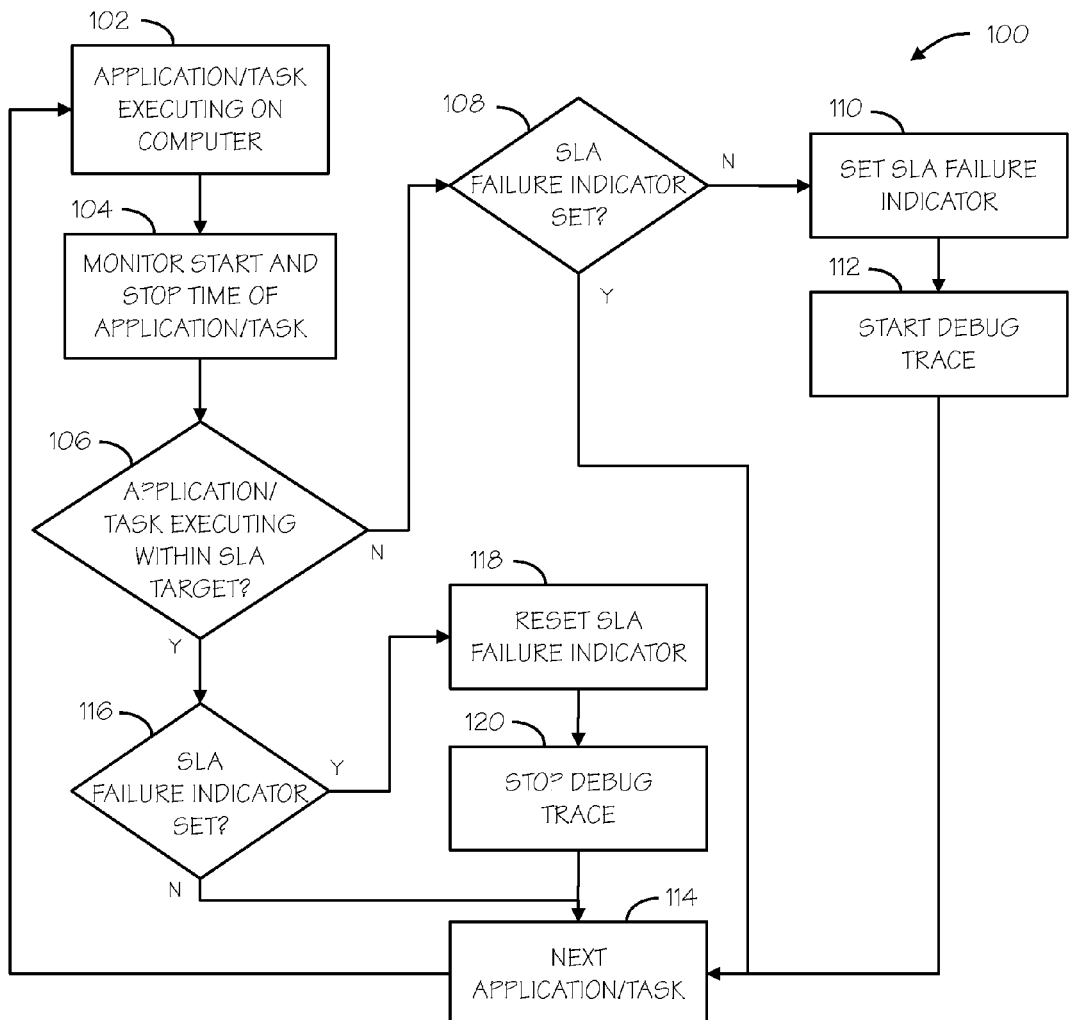
FIG. 4 is a table of potential policy actions for SLA successes.
FIG. 5 is a flowchart showing one policy implementation for SLA exceptions.

Using the potential policy actions of the tables in FIG. 3 and FIG. 4, and referring to FIG. 5, flowchart 100 illustrates one policy implementation for an embodiment when SLA performance targets are not being met. An application or task is executing on a computer (block 102), such as computer 10 in FIG. 1. While executing the start time and stop time of the application or task is monitored (block 104). Based on the start and stop times, an elapsed time is calculated. The elapsed time may then be used to determine if the application or task is operating within its SLA performance target (block 106). If the application or task is not operating with its SLA performance target ("No" branch of decision block 106), then a check is made to determine if an SLA failure indicator is set (block 108). The SLA failure indicator may be used in some embodiments to track when debug traces have been started, although one of ordinary skill in the art will recognize that other methods may also be used to track debug traces. If the SLA failure indicator has not been set ("No" branch of decision block 108), then the indicator is set to indicate an application or task failing to meet its SLA performance target (block 110) and a debug trace is started (block 112). After the debug trace has been started, the next application or task is selected (block 114) and the process continues at block 102. If, however, the SLA indicator has already been set, indicating that a debug trace is already active ("Yes" branch of decision block 108), then the next application or task continues at block 114.

If the application or task is executing within its SLA performance target ("Yes" branch of decision block 106), then a check is made to determine if the SLA failure indicator has been set (block 116). If the SLA failure indicator has not been set ("No" branch of decision block 116), then the next application or task is selected (block 114) and the process continues at block 102. If, however, the SLA failure indicator has been set ("Yes" branch of decision block 116), indicating that a debug trace is active, then the SLA failure indicator is reset (block 118) and the debug trace is stopped (block 120). The information collected in the debug trace may then be analyzed by a system administrator or other support personnel. After stopping the debug trace, the next application or task is selected (block 114) and the process continues at block 102. While flowchart 100 illustrates a basic serial process for executing applications or tasks for illustration purposes, one of ordinary skill in the art will appreciate that the applications and tasks may be executed serially, simultaneously sharing resources, or in a parallel configuration. Resource sharing and parallelization may, in some embodiments, contribute to missed SLA performance targets, thus initiating debug traces as illustrated in flowchart 100.

In other embodiments, CPU time may be tracked rather than elapsed time. In these embodiments, if the CPU time exceeds an SLA target for CPU, tracing may be started similar to the embodiment described above related to measuring elapsed time. The CPU SLA target value may be a previously detected average CPU usage for the application.

Figure 6:
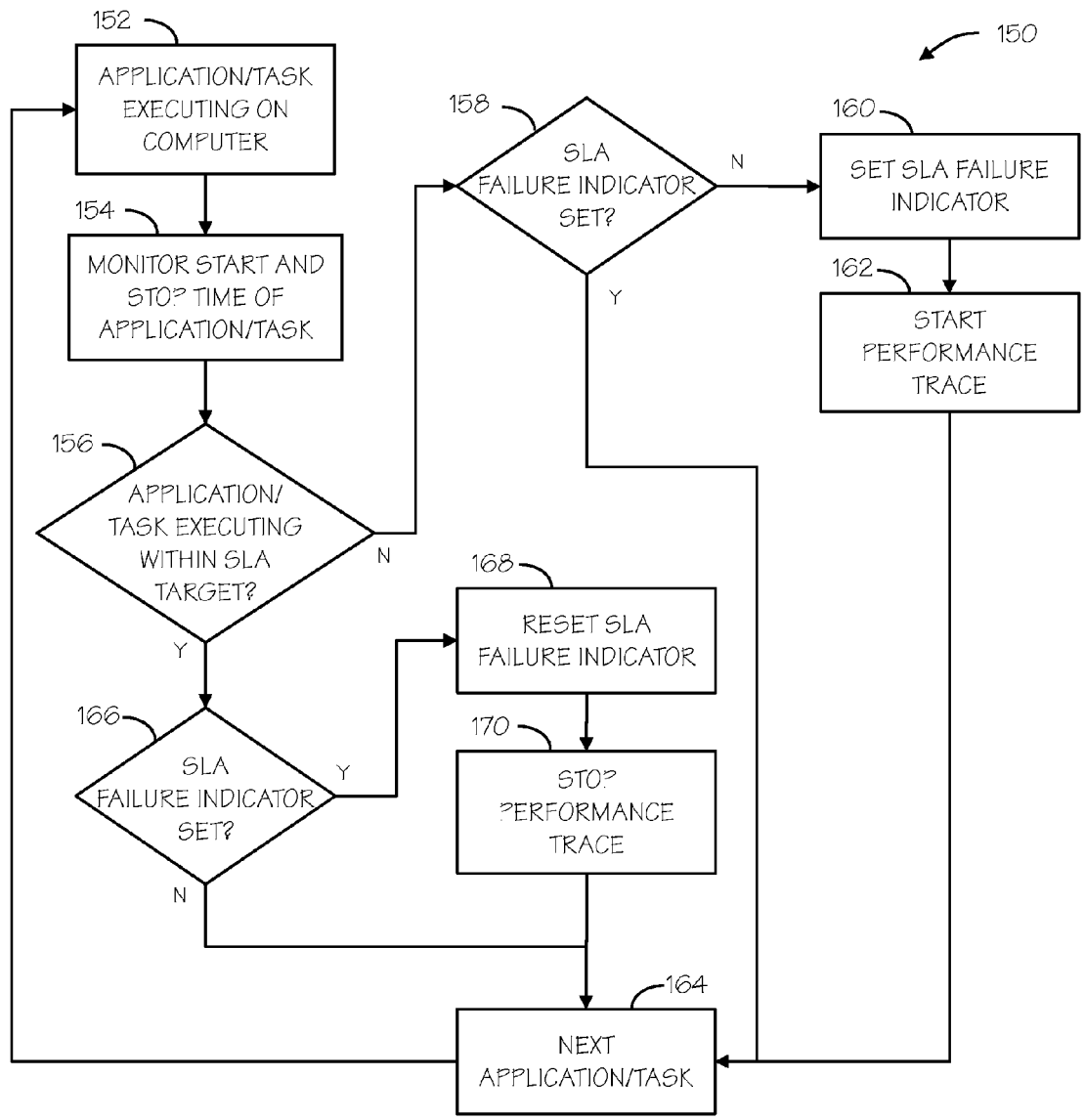
FIG. 6 is a flowchart showing an alternate policy implementation for SLA exceptions.

Using the potential policy actions of the tables in FIG. 3 and FIG. 4, and in an alternate embodiment in FIG. 6, flowchart 150 illustrates another policy implementation for failure to meet SLA performance targets. In this embodiment, a debug trace may not be available on the computer, such as computer 10 in FIG. 1. Instead a performance trace may be used as seen in the flowchart. An application or task is executing on a computer (block 152). While executing, the start time and stop time of the application or task is monitored (block 154). Based on the start and stop times, an elapsed time is calculated. The elapsed time may then be used to determine if the application or task is operating within its SLA performance target (block 156). If the application or task is not operating with its SLA performance target ("No" branch of decision block 156), then a check is made to determine if an SLA failure indicator is set (block 158). As with the previous embodiment, the SLA failure indicator may be used to track when performance traces have been started, although one of ordinary skill in the art will recognize that other methods may also be used to track traces. If the SLA failure indicator has not been set ("No" branch of decision block 158), then the indicator is set to indicate an application or tasks failing to meet its SLA performance target (block 160) and a performance trace is started (block 162). After the performance trace has been started, the next application or task is selected (block 164) and the process continues at block 152. If, however, the SLA indicator has already been set, indicating that a performance trace is already active ("Yes" branch of decision block 158), then the next application continues at block 164. In some alternate embodiments, multiple traces may also be started. In these embodiments, instead of skipping the start of the trace as shown in flowchart 150, a performance trace (or a debug trace as in the previous embodiment) may be started for each application and task. This additional trace detail may further assist a system administrator or other support personnel in diagnosing failure of meeting SLA performance targets.

If the application or task is executing within its SLA performance target ("Yes" branch of decision block 156), then a check is made to determine if the SLA failure indicator has been set (block 166). If the SLA failure indicator has not been set ("No" branch of decision block 166), then the next application or task is selected (block 164) and the process continues at block 152. If, however, the SLA failure indicator has been set ("Yes" branch of decision block 166), indicating that a performance trace is active, then the SLA failure indicator is reset (block 168) and the performance trace is stopped (block 170). The information collected in the performance trace may then be analyzed by the system administrator or other support personnel. After stopping the performance trace, the next application or task is selected (block 164) and the process continues at block 152. While flowchart 150 illustrates a basic serial process for executing applications or tasks for illustration purposes, as with the embodiment above, one of ordinary skill in the art will appreciate that the applications and tasks may be executed serially, simultaneously sharing resources, or in a parallel configuration. Resource sharing and parallelization may, in some embodiments, contribute to missed SLA performance targets, thus initiating performance traces as illustrated in flowchart 150.

Figure 7:
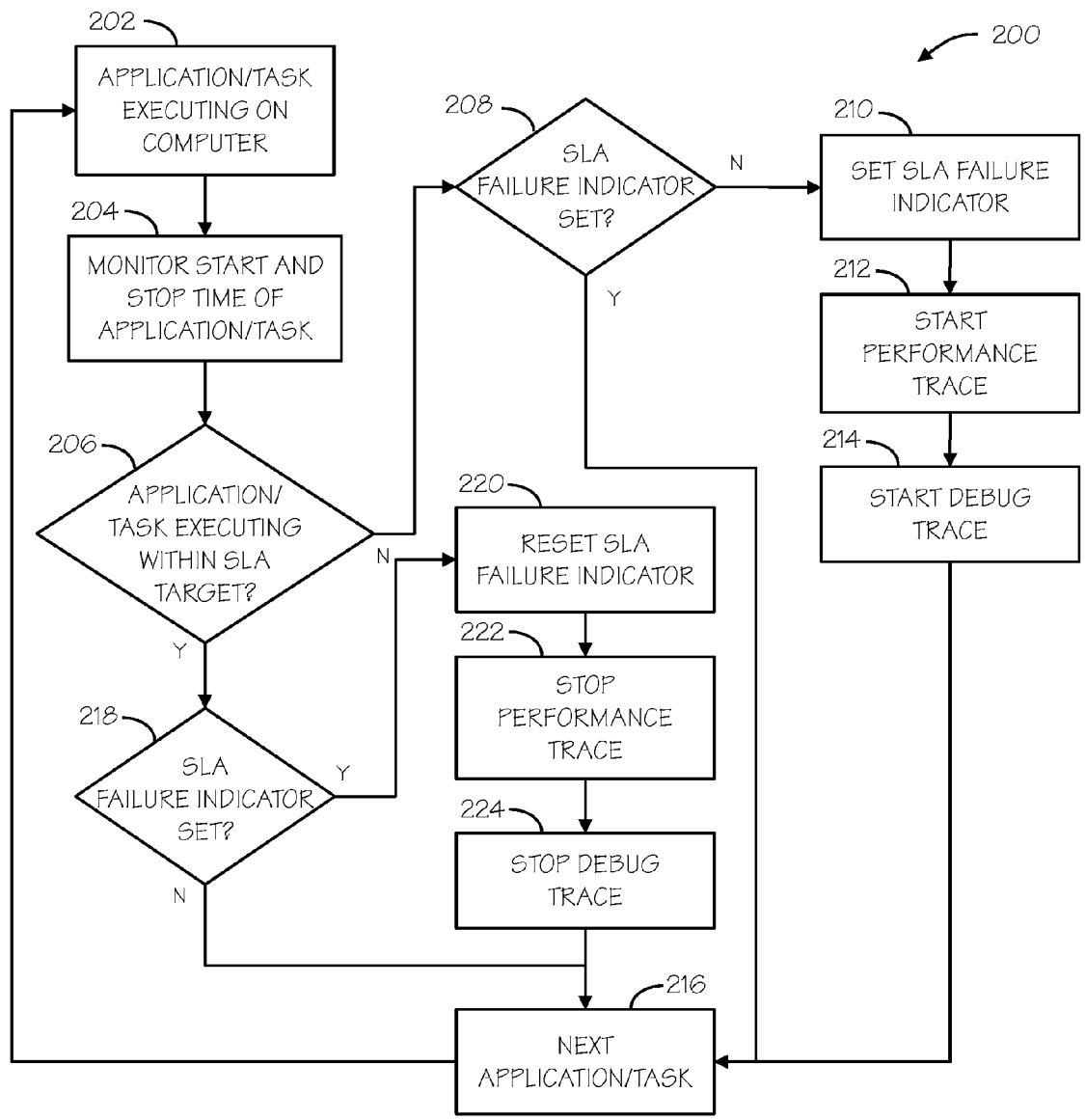
FIG. 7 is a flowchart showing an alternate policy combining the policies of FIG. 5 and FIG. 6.

Using the potential policy actions of the tables in FIG. 3 and FIG. 4, and in another alternate embodiment in FIG. 7, flowchart 200 illustrates another policy implementation for failure to meet SLA performance targets. In this embodiment, both debug tracing and performance tracing may be available on the computer, such as computer 10 in FIG. 1. In this embodiment, it may be advantageous for diagnosing failures to use collected debug trace data and performance trace data. An application or task is executing on a computer (block 202). While executing, the start time and stop time of the application or task is monitored (block 204). Based on the start and stop times, an elapsed time is calculated. The elapsed time may then be used to determine if the application or task is operating within its SLA performance target (block 206). If the application or task is not operating with its SLA performance target ("No" branch of decision block 206), then a check is made to determine if an SLA failure indicator is set (block 208). As with the previous embodiments, the SLA failure indicator may be used to track when traces, in this case either debug, performance or both, have been started, although one of ordinary skill in the art will recognize that other methods may also be used to track traces. If the SLA failure indicator has not been set ("No" branch of decision block 208), then the indicator is set to indicate an application or process failing to meet its SLA performance target (block 210) and a performance trace is started (block 212) as well as a debug trace (block 214). After the traces have been started, the next application or task is selected (block 216) and the process continues at block 202. If, however, the SLA indicator has already been set, indicating that traces are already active ("Yes" branch of decision block 208), then the next application continues at block 216. In some alternate embodiments, either the debug trace or the performance trace may be individually set for certain applications or tasks. For those tasks where a performance trace would provide little value, the performance trace may be skipped in order to avoid any additional burden introduced on the system by the trace. Likewise, in some embodiments, the debug trace may be skipped for some applications or tasks if the results of the debug trace would not provide additional value. In these embodiments, policy would determine when and which traces would be started for applications and traces failing to meet SLA performance targets.

If the application or task is executing within its SLA performance target ("Yes" branch of decision block 206), then a check is made to determine if the SLA failure indicator has been set (block 218). If the SLA failure indicator has not been set ("No" branch of decision block 218), then the next application or task is selected (block 216) and the process continues at block 202. If, however, the SLA failure indicator has been set ("Yes" branch of decision block 218), indicating that at least one debug or performance trace is active, then the SLA failure indicator is reset (block 220) and the performance trace is stopped (block 222) as well as the debug trace (block 224). The information collected in the debug and performance traces may then be analyzed by the system administrator or other support personnel. After stopping the traces, the next application or task is selected (block 216) and the process continues at block 202. While flowchart 200 illustrates a basic serial process for executing applications or tasks for illustration purposes, as with the embodiments above, one of ordinary skill in the art will appreciate that the applications and tasks may be executed serially, simultaneously sharing resources, or in a parallel configuration. Resource sharing and parallelization may, in some embodiments, contribute to missed SLA performance targets, thus initiating debug and performance traces as illustrated in flowchart 200.

While three implementations of policy actions for autonomically starting and stopping traces have been presented above, one of ordinary skill will realize that other combinations of policies both listed in the tables in FIG. 3 and FIG. 4 as well as other policies not listed may be used to implement embodiments of the invention on a computer. Moreover, while an "on/off" type indicator has been described in relation to the embodiments above, the indicator could also be implemented such that it could track multiple traces or track a debug trace, a performance trace, or both for a particular application or task. Furthermore, it will be appreciated that traces other than debug or performance may also be used based on the capabilities and configuration of the computer system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for performance data collection, the method comprising:
   monitoring a start time and a stop time of a first application and a second application using at least one processor;
   comparing the start time with the stop time of each application to determine if the first application is meeting a performance target of the first application and the second application is meeting a performance target of the second application; and
   in response to the first application not meeting the performance target of the first application, autonomically starting a performance data collection for the first application; and
   in response to the second application meeting the performance target of the second application, autonomically stopping the performance data collection for the first application.

2. The computer implemented method of claim 1, wherein starting the performance data collection comprises:
   starting a debug trace.

3. The computer implemented method of claim 1, wherein starting the performance data collection comprises:
   starting a performance trace.

4. The computer implemented method of claim 3, wherein starting the performance data collection further comprises:
   starting a debug trace.

5. The computer implemented method of claim 1, further comprising:
   in response to the application not meeting the performance target of the application, setting an indicator indicative of the application not meeting the performance target.

6. The computer implemented method of claim 5, wherein the application is a first application, and the method further comprises:
   monitoring a start time and a stop time of a second application;
   determining from the start time and the stop time if the second application is meeting a performance target of the second application; and
   in response to the second application meeting the performance target of the second application, resetting the indicator indicative of the first application not meeting the performance target.

7. The computer implemented method of claim 1, further comprising:
adjusting the performance target to account for the performance data collection.

8. The computer implemented method of claim 1, wherein the performance target is a Service Level Agreement ("SLA").

9. The computer implemented method of claim 1, wherein the start time of the application is a start time for a task within the application, the stop time of the application is a stop time for the task within the application, and the performance target is related to the task.

10. The computer implemented method of claim 9, wherein the task is selected from a group consisting of sub-applications, logic algorithms, database access, general input/output, and combinations thereof.

11. An apparatus, comprising:
a memory;
a processor; and
a computer program code resident in the memory and configured to be executed by the processor for performance data collection, the computer program code configured to monitor a start time and a stop time of a first application and a second application, compare the start time with the stop time of each application to determine if the first application is meeting a performance target of the first application and if the second application is meeting a performance target of the second application, in response to the application not meeting the performance target of the application, autonomically start a performance data collection for the application, and in response to the second application meeting the performance target of the second application, autonomically stopping the performance data collection for the first application.

12. The apparatus of claim 11, wherein the computer program code is configured to start the performance data collection by starting a debug trace.

13. The apparatus of claim 11, wherein the computer program code is configured to start the performance data collection by starting a performance trace.

14. The apparatus of claim 11, wherein the computer program code is further configured to adjust the performance target to account for the performance data collection.

15. The apparatus of claim 11, wherein the performance target is a Service Level Agreement ("SLA").

16. The apparatus of claim 11, wherein the start time of the application is a start time for a task within the application, the stop time of the application is a stop time for the task within the application, and the performance target is related to the task.

17. A program product, comprising:
a computer readable storage medium; and
a computer program code configured for performance data collection, the computer program code resident on the computer readable medium and configured to monitor a start time and a stop time of a first application and a second application, compare the start time with the stop time of each application to determine if the first application is meeting a performance target of the first application and if the second application is meeting a performance target of the second application, in response to the application not meeting the performance target of the application, autonomically start a performance data collection for the application, and in response to the second application meeting the performance target of the second application, autonomically stopping the performance data collection for the first application.

* * * * *